June 6, 1961

H. S. PRICE 2,986,930

ENGINE TRUNNION MOUNTING AND THRUST INDICATING MEANS

Filed Nov. 7, 1957

*INVENTOR.*
HILLIARD S. PRICE
BY
*Knox & Knox*

June 6, 1961  H. S. PRICE  2,986,930
ENGINE TRUNNION MOUNTING AND THRUST INDICATING MEANS
Filed Nov. 7, 1957
2 Sheets-Sheet 2
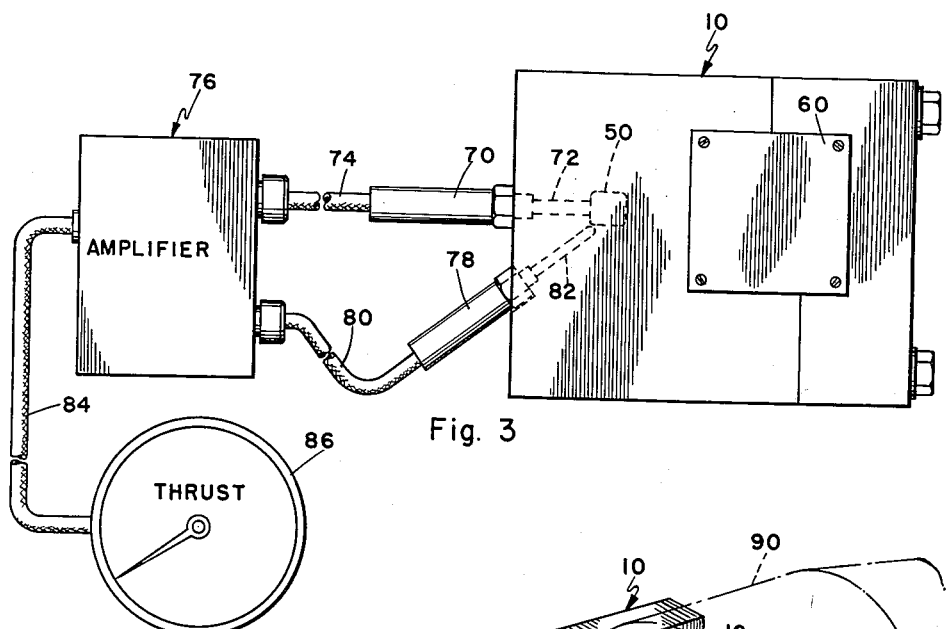
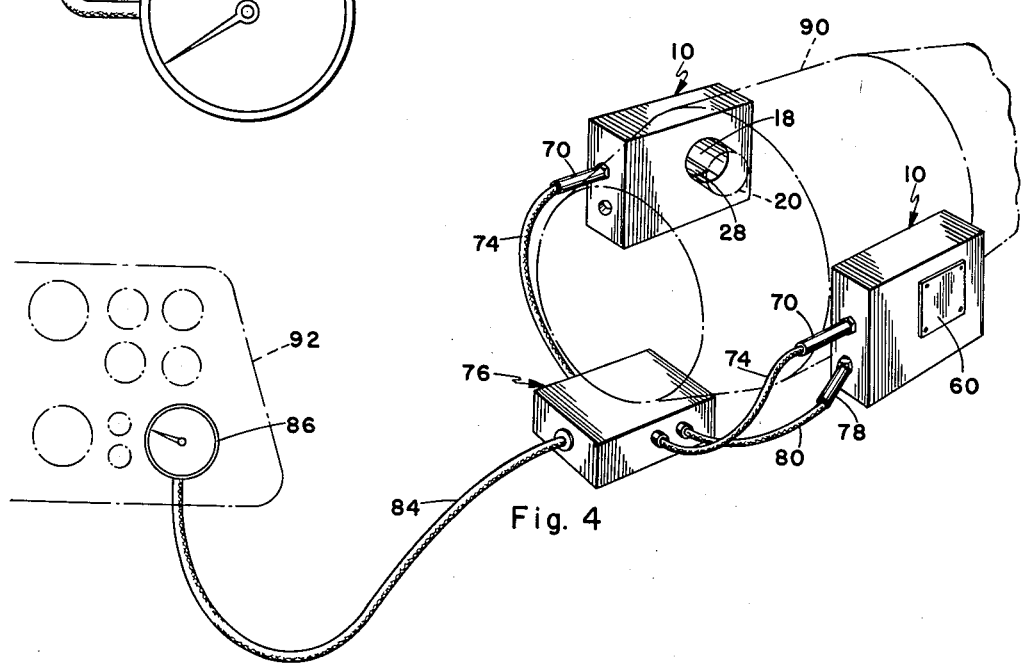
INVENTOR.
HILLIARD S. PRICE
BY
Knox & Knox

United States Patent Office 2,986,930
Patented June 6, 1961

2,986,930
ENGINE TRUNNION MOUNTING AND THRUST INDICATING MEANS
Hilliard S. Price, San Diego, Calif., assignor to Ryan Aeronautical Co., San Diego, Calif.
Filed Nov. 7, 1957, Ser. No. 695,073
7 Claims. (Cl. 73—141)

The present invention relates generally to aircraft engine mountings and more particularly to an engine trunnion mounting and thrust indicating means.

Current types of aircraft engine mountings often incorporate strain gauges to indicate structural loads at the suspension points of the mounting. These strain gauges are normally attached to the tripod or similar type fitting in which the engine mounting trunnion is secured and consequently provide indication of all strains in all directions.

The present device provides for indication of the engine thrust only, this being the measurement of most interest to the pilot since the performance of the aircraft depends primarily on the output of the engine. The initial means for indicating the thrust is incorporated directly into the trunnion mounting itself and is operative through a closed fluid system and associated electrical system independent of the rest of the aircraft functions, the system being temperature compensated to prevent inaccurate readings due to heating effects of the engine on the trunnion fittings.

The primary object of this invention is to provide an engine mounting which contains trunnion bearings for supporting the engine to be mounted therein and has a fluid pressure sensing means within the mounting actuated directly by the thrust of the engine to indicate such thrust to the pilot of the aircraft.

Another object of this invention is to provide a thrust-meter fitting in which the engine trunnion is supported on a roller mounted carriage designed to carry static mass and side loads to reduce friction to a minimum.

Another object of this invention is to provide a thrust-meter fitting wherein the thrust of the engine is applied directly to a closed, temperature compensated fluid system having means coupled thereto to actuate an electrical type indicator which shows the exact thrust of the engine at all times.

Another object of this invention is to provide a thrust-meter fitting which contains a minimum number of parts and is simple and economical to manufacture.

Another object of this invention is to provide a thrust-meter fitting which is readily adaptable to virtually all types of aircraft engines.

Finally, it is an object of this invention to provide an engine mounting of the aforementioned character which is simple, safe and convenient to install and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 3 is a side elevation view of the fitting on a reduced scale, showing the connections to a thrust-indicating system; and FIGURE 4 is a diagrammatic perspective view of the installation of two of the fittings for mounting an aircraft engine.

Similar characters of reference indicate similar or identical elements and portions throughout the specification and throughout the views of the drawings.

Figure 1:
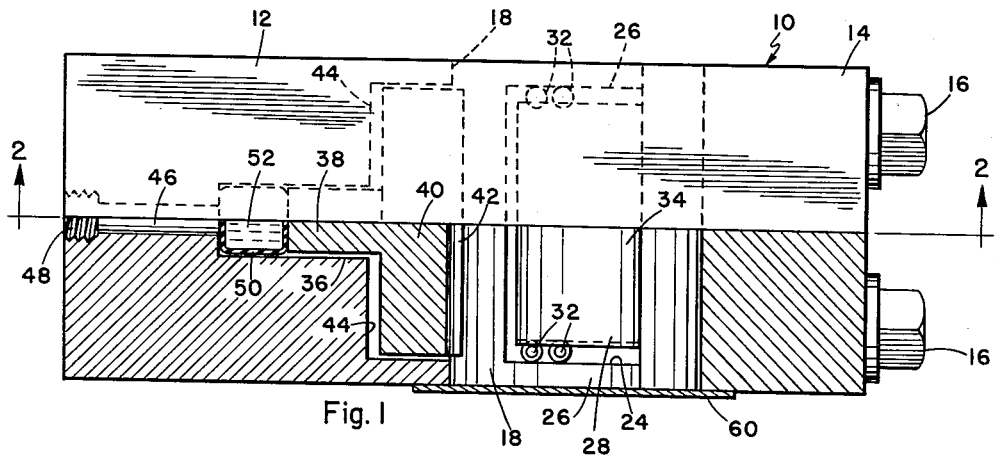
FIGURE 1 is a top plan view of the fitting partially sectioned as on the line 1—1 of FIGURE 2.

Referring now to the drawings in detail, the two-piece trunnion fitting 10 comprises complementary sections, a forward section 12 and an aft section 14, joined together by means of suitable bolts 16. The division of the fitting into two parts greatly simplifies manufacture, assembly and installation of the various parts. The two-piece fitting 10 has a transverse bore 18 at the interface of the sections to receive the trunnion of the turbojet engine, the trunnion being indicated in dash line at 20. One size of fitting may be used for various engines, since trunnions smaller than the bore 18 can be fitted with a collar or sleeve of the appropriate size. Above the bore 18 the parting line between the sections 12 and 14 is substantially diametrical to said bore but below the bore, the aft section 14 is cut back and the forward section 12 is rearwardly extended as indicated at 22. In other words, the bore 18 is formed at the interface between the sections 12 and 14 and this interface has an upper part 21 and a lower part 23, said lower part being considerably offset from the upper part of the interface. In this rearwardly extended portion 22 is a generally rectangular recess 24, substantially coextensive in width with the block and having a flat base constituting a platform 25 parallel to the bore 18, the ends of said recess being closed by end walls 26. Within the recess 24 is mounted a carriage block 28 which rests on anti-friction means such as the illustrated plurality of transverse bearing rollers 30, which bear directly, or indirectly through the medium of any suitable retainer, upon the platform 25. The carriage block is spaced from the end walls 26 by side rollers 32 mounted with their axes generally vertical. It will be understood that any suitable retainer means may be provided for the bearings 30 and 32.

Figure 2:
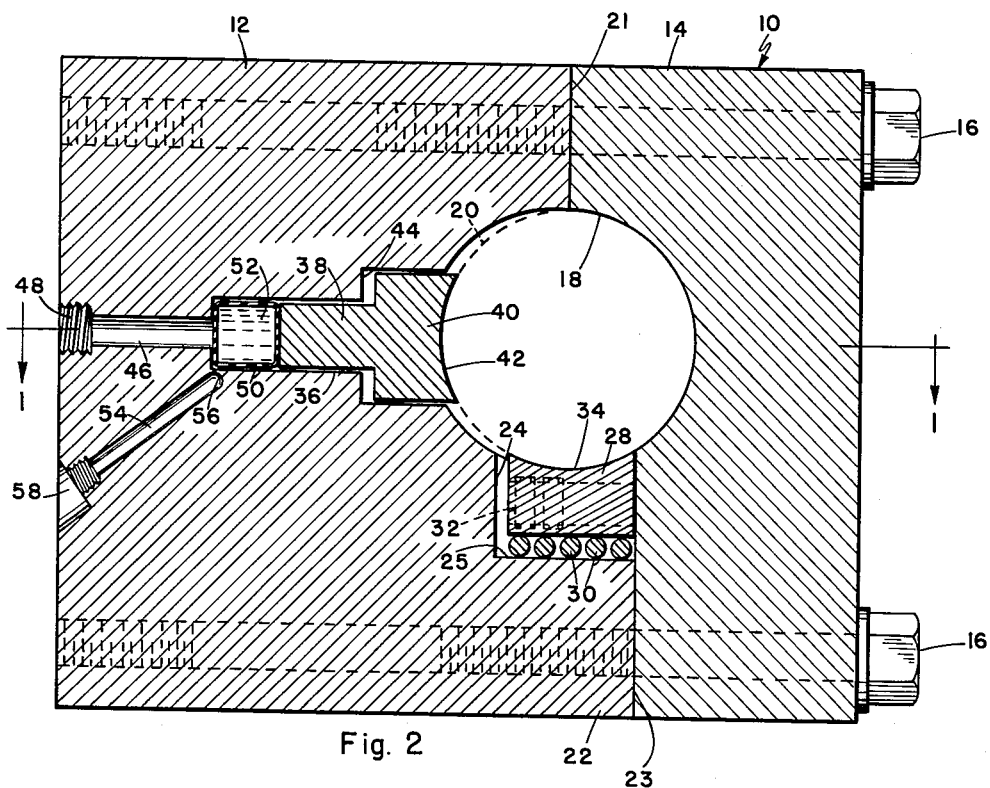
FIGURE 2 is a sectional view taken on the line 2—2 of FIGURE 1.

The upper portion of the carriage block 28 has a transversely arcuate channel 34 shaped to fit the trunnion 20, thus the trunnion, on the carriage block, is movable in a fore and aft direction. To allow such movement, the bore 18 is slightly ovoid in cross-section at one side of the bore. A considerable gap is illustrated in the drawing for clarity, although in actual practice this elongation can be reduced to a dimension on the order of 0.020 inch. It will now be evident that the engine can be readily installed by first lowering the trunnions 20 into the carriage blocks 28 while the latter are partially withdrawn as to the right in FIGURE 2, and then sliding the engine and carriage blocks forward into the portion shown, whereafter the aft section 14 can be attached and tightened into position by the bolts 16. The forward block 12 has a longitudinal bore or cylinder 36 perpendicular to and in diametrical alignment with the bore 18. Slidably mounted within the cylinder 36 is a piston 38 one end of which is enlarged to constitute a thrust block 40 of non-circular cross-sectional shape and having an arcuate face 42 to fit the trunnion 20. The section 12 has a socket 44 coextensive with the cylinder 36 and shaped to receive the thrust block 40. Extending from and axially aligned with the cylinder 36 is a tap bore 46 communicating with the forward end of the section 12 and having at its open end an internally screw-threaded tap socket 48 to receive a fluid pressure connection. Fitted into the cylinder 36 between the tap bore 46 and the piston 38 is a sealed capsule 50 of substantially resilient material, the capsule being filled with a suitable fluid 52, such as mercury, which remains in a fluid state over a wide range of temperatures. The section 12 also has a temperature sensing bore 54 in its forward portion, said bore having a blind end 56 adjacent the capsule 50 and having at its open end an internally screw-threaded socket 58. One end of the bore 18 is closed by a cover plate 60 attached by suitable screws or the like to prevent the entry of dirt or foreign matter into the fitting.

The basic system for obtaining a thrust reading from the fitting is shown in FIGURE 3, in which a pressure sensing probe 70 is inserted into the tap bore 46, said probe comprising a tubular element 72 having a closed end which is in firm contact with the capsule 50. The tubular element 72 is of substantially resilient material so that changes of pressure in the capsule 50 are transmitted to the probe 70, such devices being well known in the art. This pressure sensing probe is a conventional device for translating a pressure factor into an electrical factor to produce a voltage output, several such devices being presently available, and said probe is connected by a conductor 74 to a transmitter 76. Pressure sensitive probes frequently operate on the principle of variation in resistivity caused by elongations and shortenings produced by variation of external pressure applied to a conductor, such as the wires of a strain gauge. Other pressure sensitive probes incorporate a piezoelectric crystal that generates a voltage when it is compressed by variations of the external pressure applied to it. Still other pressure transducers use diaphragms, bellows, Bourdon tubes, and devices to convert mechanical movement into electrical signals. A temperature sensing probe 78 is inserted into the bore 54 and is connected to the transmitter 76 by a conductor 80. The temperature sensing probe 78 is similar to the probe 70 and comprises a closed tubular element 82 which extends to the end of the bore 54 and contains a fluid such as mercury, the device being well known in the art. The mercury expands in accordance with the temperature, and may apply pressure to a piezoelectric crystal that generates a corresponding voltage. Another form of temperature sensing probe uses a thermocouple in the barrel thereof, the thermocouple producing a voltage in accordance with the temperature. Pressure and temperature sensitive probes are produced by many manufacturers, such as Fairchild Controls Corp., Conax Corp., Consolidated Electrodynamics Corp., and Bourns Laboratories Inc. A description of the operation of these devices may be found in "Computers" by Fahnstock on page 199 et seq. Thus the transmitter 76 receives two voltage inputs; one from the probe 70 which varies proportionately with the thrust against the capsule 50 and the other from the probe 78 which varies slightly according to the temperature of the fitting 10. The thrust pressure, thus corrected for temperature variation, produces a resultant voltage proportional to the true effective thrust at the trunnion and this voltage is carried from the transmitter 76, through a conductor 84, to a galvanometer-type thrust meter 86, providing a direct thrust reading in suitable units.

In actual use, of course, two trunnion fittings 10 would be used to support an engine such as a turbojet 90 indicated in broken line in FIGURE 4. In this installation, the probes 70 and 78 of one fitting 10 are connected to the transmitter 76, but only one pressure sensing probe, for example that indicated at 70, need be connected to the amplifier since the temperature is normally constant at both sides of the engine. The transmitter 76 may be a magnetic amplifier, or any other suitable type of electrical transmitter readily available, and is arranged to combine the voltage inputs from both pressure sensing probes 70 and subtract from it twice the voltage input from the temperature sensing probe 78, the result being the true total thrust factor at both trunnion fittings 10. The circuitry involved is well known in the art and does not constitute a critical part of the present invention.

In a specific example:
Boyle's and Charles's laws give $$PV = RT$$

thus $$P_2 = \frac{P_1 T_2}{T_1} = 4.0799 T_2$$

where $P_1$=initial pressure (2116.22 lb./ft.² at S.L.)
$T_1$=initial or reference temperature (516.688° R. at S.L.)
$T_2$=elevated temperature (° F.)
$P_2$=pressure due to elevated temperature (lb./ft.²)
$V$=volume (constant)
$R$=universal gas constant Thus the pressure factor at each trunnion must be corrected by the factor 4.0799 pounds per square foot per degree Fahrenheit increase in temperature from a base reference temperature, the correction being linear. Since two pressure factors from two trunnions are combined, the correction factor must also be doubled, so that the total correction factor for the system shown in FIGURE 4 is 8.1598 lb./ft.² per degree F. variation from a predetermined reference temperature.

The thrust meter 86 is calibrated according to the following:

$$F = (PL + PR) - 8.1598 TK$$

where $F$=pounds of thrust.
$PL$=voltage signal from left side pressure sensing probe.
$PR$=voltage signal from right side pressure sensing probe.
$T$=voltage signal from temperature probe.
$K$=constant of calibration. (Volts per pound of force and volts per degree of temperature rise.)

The thrust meter 86 is mounted in a convenient position on the pilot's instrument panel, indicated at 92, so that the pilot is aware of his exact thrust at any time. The system is such that any loss of thrust is immediately apparent at the thrust meter and may provide advance warning of pending engine trouble before the power loss is noticeable in the performance of the aircraft.

The mounting is suitable for many types of engines such as turbojet, propeller turbines, piston engines, rockets or ramjets, either in an aircraft or in a static test rig.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:

1. Engine mounting and thrust indicating means, comprising: a trunnion fitting having a transverse trunnion receiving bore, slightly ovoid in cross-section to permit movement of a trunnion normal to the axis thereof in response to the engine thrust; a sealed capsule containing a substantially resilient fluid positioned in said trunnion fitting between said trunnion receiving bore and a wall of said trunnion fitting, whereby said fluid may be compressed by the thrust caused by movement of said trunnion to have the pressure of said fluid varied; fluid pressure sensing means providing a continuous variable response to pressure located in said trunnion fitting in contact with said capsule for sensing the variations of said fluid pressure produced by movement of the trunnion; and a thrust indicator operatively connected to said fluid pressure sensing means, whereby thrust impressed on said fitting, equivalent to the thrust on the trunnion, is directly measured.

2. Engine mounting and thrust indicating means, comprising: a trunnion fitting having a trunnion receiving bore and a recess defining a radially downward extension of said bore, said bore being slightly ovoid in cross-section to permit movement of a trunnion in the direction of the thrust of an engine to be mounted in the fitting; a trunnion-supporting carriage block mounted within said recess and projecting slightly into said ovoid bore for movement parallel to the direction of thrust and normal to the axis of the trunnion; a piston within said fitting and having a portion engageable by the trunnion and slidably mounted to follow said trunnion in said movement thereof in said direction; a fluid-containing capsule positioned to be compressed by movement of said piston, whereby the pressure of said fluid is varied; fluid pressure sensing means in said trunnion fitting and contacting said capsule; and a thrust indicator operatively connected to said fluid pressure sensing means, whereby thrust impressed on said fitting, equivalent to the thrust on the trunnion, is directly measured.

3. Engine mounting and thrust indicating means, comprising: a trunnion fitting having a trunnion receiving bore and a recess defining a radially downward extension of said bore, said bore being slightly ovoid in cross-section to permit movement of a trunnion in the direction of the thrust of an engine to be mounted in the fitting; a trunnion-supporting carriage block mounted within said recess and projecting slightly into said ovoid bore for movement parallel to the direction of thrust; and antifriction means operatively mounted in said recess between said carriage block and said fitting; a cylinder in said fitting having its axis generally parallel to the direction of thrust; a piston operatively mounted in said cylinder and having a portion extending into said bore for engagement with the trunnion; a fluid filled pressure capsule in said cylinder, said capsule positioned at the end of the cylinder opposite that at which the contact between the piston and trunnion takes place; a thrust indicator, and means for operatively connecting said indicator to said capsule to indicate the pressure imposed thereon by the thrust of the engine.

4. Engine trunnion mounting and thrust indicating means, comprising: a pair of two-piece trunnion fittings for supporting the trunnions of an engine, each having a transverse trunnion receiving bore and a recess defining a radially downward extension of said bore, said bores being slightly elongated in the direction of thrust to permit limited movement of the trunnion and said recess housing a trunnion-supporting carriage; a pair of mechanical movement sensing elements, one element mounted in each of said fittings in contact with and sensing movement of the corresponding trunnion in said direction; means to convert the sensed individual movements of said elements into pressure variations; transmitter means to convert the pressure variations into a combined voltage signal proportional to the total thrust represented by the original sensed movement of the trunnions and an indicator operatively connected to said transmitter means to provide visual indication of said total thrust.

5. Engine trunnion mounting and thrust indicating means, comprising: a pair of blocks for supporting the trunnions of an engine, each having a transverse trunnion-receiving bore and a recess defining a radially downward extension of said bore, said bores being slightly elongated in the direction of thrust to permit limited movement of the trunnion, and said recesses each housing a trunnion-supporting carriage; a mechanical movement sensing element in each block operatively engaged by the corresponding trunnion; fluid presure means in each said blocks, said fluid pressure means positioned between said mechanical movement sensing elements and the wall of said blocks toward which said trunnions are moved by said thrust; a pressure sensing probe connected to said fluid presure means of each block and being adapted to provide an electrical signal proportional to the pressure sensed thereby; one of said blocks having a temperature sensing probe therein adjacent the fluid pressure means, said temperature sensing probe being adapted to provide an electrical signal proportional to the temperature sensed thereby; a transmitter operatively connected to all of said probes and being adapted to provide a predetermined composite output signal therefrom; and a thrust indicator connected to said transmitter to give visual indication of said composite output signal.

6. Engine mounting and thrust indicating means, comprising: a trunnion fitting having a trunnion-receiving bore slightly ovoid in cross-section to permit movement of a trunnion in the direction of the thrust of an engine to be mounted in the fitting, said trunnion fitting being divided into two complementary sections with said bore being defined at the interface of the sections; one of said sections having a recess defining a radially downward extension of said bore, said recess having a flat base constituting a platform; a trunnion-supporting carriage block mounted on said platform of said recess by means of an anti-friction device and extending slightly into said bore for movement parallel to the direction of thrust; a piston slidably mounted within said fitting and having a portion engageable by the trunnion; a fluid-containing capsule positioned to be compressed by the end of said piston as said piston slides in accordance with the trunnion movement produced by said thrust; fluid pressure sensing means in said trunnion fitting and operated by said piston; and a thrust indicator operatively connected to said fluid pressure sensing means.

7. Apparatus according to claim 6 wherein said one of said sections has an extended portion fitted into the other section so that the portion of said interface at one side of said bore is offset from the portion of the interface at the opposite side of said bore; said recess being in said extended portion; whereby assembly of a trunnion into the fitting is facilitated.

References Cited in the file of this patent

UNITED STATES PATENTS

| | | |
|---|---|---|
| 1,499,861 | Eaton | July 1, 1924 |
| 2,054,787 | Beavers | Sept. 22, 1936 |
| 2,281,871 | Corby | May 5, 1942 |
| 2,426,089 | Fitzgerald | Aug. 19, 1947 |
| 2,498,995 | Manning | Feb. 28, 1950 |
| 2,575,973 | Perry | Nov. 20, 1951 |